(12) United States Patent
Stark (10) Patent No.: US 9,733,699 B2
(45) Date of Patent: Aug. 15, 2017

(54) VIRTUAL ANAMORPHIC PRODUCT DISPLAY WITH VIEWER HEIGHT DETECTION

(71) Applicant: Dean Stark, Toronto (CA)

(72) Inventor: Dean Stark, Toronto (CA)

(*) Notice: Subject to any disclaimer, the term of this patent is extended or adjusted under 35 U.S.C. 154(b) by 44 days.

(21) Appl. No.: 13/652,043

(22) Filed: Oct. 15, 2012

(65) Prior Publication Data
US 2013/0069880 A1 Mar. 21, 2013

Related U.S. Application Data

(63) Continuation of application No. PCT/CA2011/000413, filed on Apr. 13, 2011.
(Continued)

(51) Int. Cl.
*G06F 3/01* (2006.01)
*G06T 1/60* (2006.01)
(Continued)

(52) U.S. Cl.
CPC ............... *G06F 3/011* (2013.01); *G06T 1/60* (2013.01); *G06T 3/0093* (2013.01); *G06T 11/00* (2013.01);
(Continued)

(58) Field of Classification Search
CPC ........ G09G 3/001; G09G 3/002; G09G 3/003; G09G 2360/18; G09G 2340/04; G09G 2354/00; G06F 3/011; G06F 3/012
(Continued)

(56) References Cited

U.S. PATENT DOCUMENTS 5,224,901 A * 7/1993 Dahl ..................... G09F 19/12
40/433
6,183,089 B1 2/2001 Tehrani ............................ 353/7
(Continued)

FOREIGN PATENT DOCUMENTS

CA 2794542 8/2011
CA 2794489 9/2011
(Continued)

OTHER PUBLICATIONS

International Search Report mailed Aug. 15, 2011 in corresponding PCT International Application No. PCT/CA2011/000413.
(Continued)

*Primary Examiner* — Gene W Lee (57) ABSTRACT

A product display system comprising a display surface; a height sensor for determining a height of a user; an input device for receiving a product selection from the user, where the product selection corresponding to one or more products; a computing device coupled to the height sensor and to the input device, the computing device comprising a frame buffer for outputting images to be displayed on the display surface, the computing device being configured to: receive the product selection from the input device; receive the height from the height sensor and, based on the height, determine a viewing angle of the user in relation to the display surface; and write to the frame buffer one or more images comprising virtual versions of the one or more products, thereby causing the one or more images to be displayed on the display surface, the one or more images corresponding to said viewing angle.

16 Claims, 6 Drawing Sheets

Related U.S. Application Data (60) Provisional application No. 61/323,638, filed on Apr. 13, 2010, provisional application No. 61/588,006, filed on Jan. 18, 2012.

(51) Int. Cl.
  *G09G 3/00* (2006.01)
  *G06T 15/00* (2011.01)
  *G06T 3/00* (2006.01)
  *G06T 11/00* (2006.01)

(52) U.S. Cl.
  CPC ............ *G06T 15/00* (2013.01); *G09G 3/003* (2013.01); *G09G 2340/04* (2013.01); *G09G 2354/00* (2013.01)

(58) Field of Classification Search
  USPC .................. 345/1.1–111, 156–184, 204–215, 345/690–699; 705/27.1, 27.2
  See application file for complete search history.

(56) References Cited

U.S. PATENT DOCUMENTS

| | | | | |
|---|---|---|---|---|
| 8,388,146 | B2* | 3/2013 | Goran | H04N 9/3173 348/53 |
| 8,485,668 | B2* | 7/2013 | Zhang | G03B 17/54 250/363.07 |
| 2002/0029205 | A1 | 3/2002 | Pedraza et al. | 706/21 |
| 2002/0171637 | A1 | 11/2002 | Kadowaki et al. | 345/204 |
| 2004/0036844 | A1* | 2/2004 | Wood | G06T 5/006 353/70 |
| 2004/0075735 | A1* | 4/2004 | Marmaropoulos | 348/51 |
| 2005/0055298 | A1 | 3/2005 | Czora | 705/35 |
| 2005/0264857 | A1* | 12/2005 | Vesely | G02B 27/2221 359/13 |
| 2006/0074831 | A1 | 4/2006 | Hyder et al. | 706/45 |
| 2006/0149570 | A1 | 7/2006 | McDaniel et al. | 705/26.1 |
| 2007/0097017 | A1* | 5/2007 | Widdowson | G09G 3/002 345/1.3 |
| 2008/0010169 | A1 | 1/2008 | Dollens | 705/27 |
| 2008/0022328 | A1 | 1/2008 | Miller | |
| 2008/0049020 | A1* | 2/2008 | Gusler | 345/427 |
| 2008/0256008 | A1 | 10/2008 | Kwok | 706/20 |
| 2008/0297593 | A1* | 12/2008 | Debevec | G02B 27/225 348/51 |
| 2009/0046140 | A1* | 2/2009 | Lashmet | 348/51 |
| 2009/0115721 | A1* | 5/2009 | Aull et al. | 345/156 |
| 2009/0313584 | A1* | 12/2009 | Kerr | G06F 3/012 715/849 |
| 2010/0063862 | A1 | 3/2010 | Thompson et al. | 705/7.29 |
| 2010/0106607 | A1 | 4/2010 | Riddiford et al. | |
| 2010/0125816 | A1* | 5/2010 | Bezos | G06F 1/1626 715/863 |
| 2010/0149182 | A1* | 6/2010 | Butler | G06F 3/011 345/424 |
| 2010/0238188 | A1* | 9/2010 | Miceli | 345/582 |
| 2011/0191681 | A1 | 8/2011 | Stark | 715/716 |
| 2011/0238535 | A1 | 9/2011 | Stark | 705/27.1 |
| 2011/0248987 | A1* | 10/2011 | Mitchell | 345/419 |
| 2011/0292347 | A1* | 12/2011 | Zhang | G03B 17/54 353/28 |
| 2012/0026376 | A1* | 2/2012 | Goran | H04N 9/3173 348/333.1 |
| 2012/0206449 | A1 | 8/2012 | Stark | 345/419 |

FOREIGN PATENT DOCUMENTS

| | | |
|---|---|---|
| CN | 102844738 | 12/2012 |
| EP | 1 837 830 | 9/2007 |
| EP | 2074911 | 7/2009 |
| EP | 2531912 | 12/2012 |
| EP | 2553647 | 2/2013 |
| JP | 2000-298544 | 10/2000 |
| JP | 2003-104554 | 4/2003 |
| JP | 2008-200256 | 9/2008 |
| KR | 10-0405988 | 11/2003 |
| WO | 02/057896 | 7/2002 |
| WO | WO 2006/047487 | 5/2006 |
| WO | WO 2006/115261 | 11/2006 |
| WO | WO 2009/032772 | 3/2009 |
| WO | 2011/120051 | 9/2011 |
| WO | 2011/127577 | 10/2011 |
| WO | 2011/127578 | 10/2011 |
| WO | 2011/097309 | 12/2011 |
| WO | 2012/106815 | 8/2012 |

OTHER PUBLICATIONS

J. L Hunt, B. G. Nickel, and Christian Gigault's paper "Anamorphic images" published in the American Journal of Physics, Mar. 2000, vol. 68, Issue 3, at pp. 232-237.

International Search Report dated Aug. 24, 2011.

International Search Report dated Oct. 4, 2011.

International Search Report dated Oct. 31, 2011.

International Search Report dated May 24, 2012.

F. Leeman et al., "Hidden Images, Games of Perception Anamorphic Art Illusion", Harry N. Abrams, Inc., Publishers, New York, pp. 85-176 (1975).

Online video of virtual presenter; http://www.youtube.com/watch?v=24U6iYYJFVg0, uploaded Oct. 2, 2010, nuMedia Innovations, Inc.

* cited by examiner

VIRTUAL ANAMORPHIC PRODUCT DISPLAY WITH VIEWER HEIGHT DETECTION

CROSS-REFERENCE TO RELATED APPLICATIONS

The present application is a continuation of International Application No. PCT/CA2011/000413, filed Apr. 13, 2011, which claims priority to U.S. Provisional Patent Application No. 61/323,638, filed Apr. 13, 2010, the contents of both which are hereby incorporated in full herein by reference. This application also claims priority to U.S. Provisional Patent Application No. 61/588,006, filed Jan. 18, 2012, the contents of which are hereby incorporated in full herein by reference.

FIELD OF THE INVENTION

The present invention relates generally to product display systems and, more specifically, to product display systems that provide virtual product visualization and interaction.

BACKGROUND

To promote products and generate sales, typical retail environments utilize floor and shelf space to display products to potential consumers. This type of display marketing helps promote the sales of the displayed products because potential customers often want to both see and interact with the actual products prior to making a purchasing decision.

Unfortunately, floor and shelf space in typical retail environments is often limited, so retailers often are only able to display a fraction of the set of products which are available for purchase. Furthermore, potential customers may have difficulty finding product displays of items they are looking for as they navigate the retail environment. Potential customers may also need to visit multiple locations of the merchant looking for particular items. Hence, potential customers may be deterred by inconveniences associated with locating products on display prior to making purchasing decisions, and sales may be lost.

The aforementioned difficulties are more acutely felt in a gift registry context, where potential customers typically want to see and interact with multiple products during the gift selection process.

To address these drawbacks, some retailers have installed kiosks in retail locations where images of products may be viewed. Unfortunately the images displayed on conventional kiosk displays provide limited, if any, interaction with, and views of, the displayed products. Hence, potential customers do not gain an experience akin to seeing and interacting with the actual product.

SUMMARY OF THE INVENTION

In accordance with an aspect of the present invention, there is provided a product display system. The system comprises: a display surface; a height sensor for determining a height of a user; an input device for receiving a product selection from the user, the product selection corresponding to one or more products; a computing device coupled to the height sensor and to the input device, the computing device comprising a frame buffer for outputting images to be displayed on the display surface, the computing device configured to: receive the product selection from the input device; receive the height from the height sensor and, based on the height, determine a viewing angle of the user in relation to the display surface; and write to the frame buffer one or more images comprising virtual versions of the one or more products, thereby causing the one or more images to be displayed on the display surface, the one or more images corresponding to the viewing angle.

In accordance with another aspect of the present invention, there is provided a method of providing virtual product interaction to a user. The method comprises: receiving a product selection from the user, the product selection corresponding to one or more products; determining a height of the user; based on the height, determining a viewing angle of the user in relation to a display surface; writing one or more images comprising virtual versions of the one or more products to a frame buffer, thereby causing the one or more images to be displayed on the display surface, the one or more images corresponding to the viewing angle.

In accordance with yet another aspect of the present invention, there is provided a product display system. The system comprises: a display surface; an input device for receiving information from the user indicative of at least product of interest; a projector mounted above the display surface; a computing device coupled to the input device and the projector, the computing device comprising a frame buffer for outputting images to be displayed by the projector on the display surface. The computing device is configured to: write to the frame buffer one or more two dimensional images comprising anamorphic projections of one more items of interest to the user, thereby causing the one or more two dimensional images to be displayed on the display surface, and allowing the user to perceive the one or more items of interest as three dimensional objects.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate embodiments of the invention by example only.

DETAILED DESCRIPTION

Figure 1:
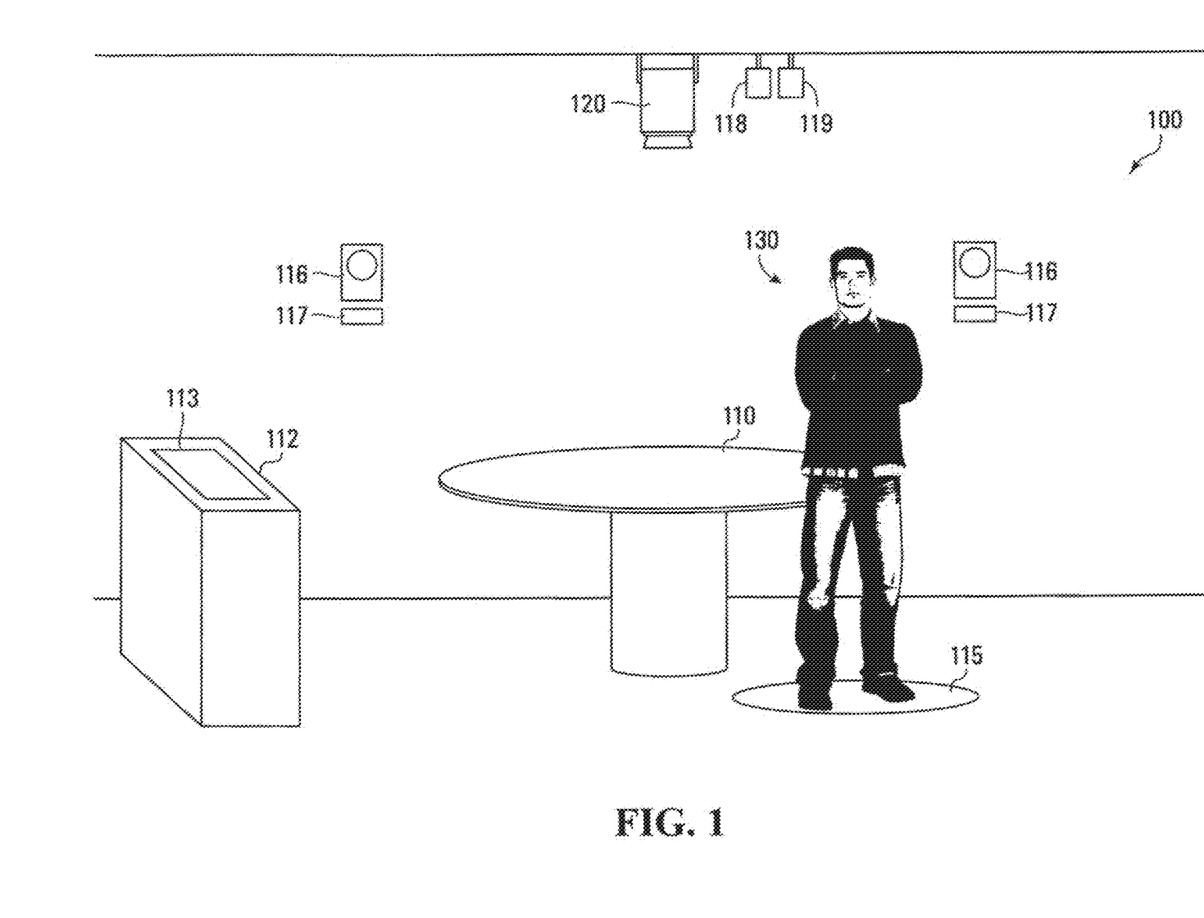
FIG. 1 is a simplified perspective view of a product display system that provides virtual product interaction, exemplary of an embodiment of the present invention.

FIG. 1 illustrates a simplified perspective view of a product display system 100 which provides virtual product interaction. Product display system 100 includes a display surface 110, a projector 120 for projecting images onto display surface 110, a user movement sensor 118, a user height sensor 119, speakers 116, scent dispensers 117, and a marker 115 indicating where a user 130 may stand in order to enjoy an optimal viewing angle and experience. System 100 may further include a kiosk 112 providing a user interface 113.

Display surface 110 may be a conventional projection screen including a surface and a support structure used for displaying projected images for viewing by a user 130. In some embodiments, display surface 110 may for example be implemented using a sheet a white vellum paper, or the like interposed between two sheets of glass, or between a sheet and another rigid support surface. Surface 110 may be supported by a base, and thereby form a table for the support of objects for sale and the like. In the depicted embodiment, display surface 110 takes the form of a round glass table.

Projector 120 may be a conventional display projector for projecting an image onto display surface 110. In some embodiments, projector 120 may be a conventional 1080p; 720p; XVGA or similar home theatre or business projector available from Sony, Mitsubishi, Sanyo, Panasonic, Epson or other known manufacturer. In an embodiment, projector 120 may be focused to project exactly and only on surface 110, allowing projector 120 to fill surface 110 (and not the environment). This may be accomplished using an appropriate throw distance, focus, and optional mask.

As shown in FIG. 1, projector 120 may be located above display surface 110, and display surface 110 is oriented substantially horizontally. However, it will be appreciated that projector 120 may be positioned in different locations, and that display surface 110 may be arranged in different orientations. For example, in some embodiments projector 120 may be positioned directly below display surface 110 and display surface 110 may be a rear-projection screen. Alternatively, projector 120 may be obliquely mounted at a location above, but not directly above surface 110.

In some embodiments, multiple projectors in multiple locations may be used. For example, a projector 120 mounted above surface 110, and a second projector mounted beneath surface 110. Both projectors may be operated concurrently to present images on surface 110.

It will also be appreciated that in some embodiments display surface 110 may be a digital display screen forming part of a digital display, such as a Liquid Crystal Display (LCD) or the like (in such embodiments, projector 120 may not be required).

As described in more detail below, user movement sensor 118 is operable to detect hand and/or arm gestures of user 130 in the vicinity of display surface 110 to thereby allow user 130 to interact with product display system 100.

User height sensor 119 is operable to detect the height of user 130, and may for example comprise one or more cameras and machine vision software as is known in the art. Alternatively, height sensor 119 may be an infrared sensor, a sonic sensor, or other appropriate sensor for sensing the presence and height of an individual. As will be apparent, user height sensor 119 serves to approximate the viewing height of a user proximate surface 110.

Kiosk 112 may be a computer terminal that provides information access by way of user interface 113, which may be a conventional touch-screen display or the like.

As will become apparent, user 130 may initiate an interaction with product display system 100 through user interface 113 of kiosk 112. Specifically, user interface 113 may present options to user 130, such as the following options: (1) browse products catalogue; (2) create a gift registry; and (3) view an existing gift registry. If user 130 selects one of the presented options, user interface 113 may then present a conventional menu for browsing a product catalogue, creating a gift registry, or viewing an existing gift registry, including enabling user 130 to create a user profile or to login to an existing user profile. Additionally, user interface 113 may enable user 130 to initiate a virtual product interaction session. If user 130 selects this option, projector 120 displays substantially life-size, realistic images of selected products on display surface 110. Product display system 100 may use speakers 116 and scent dispensers 117 to enhance the sensory experience of user 130 by providing sounds and scents associated with the images displayed on display surface 110.

Product display system 100 may also use user movement sensor 118 to enable user 130 to virtually interact with the displayed images. For example, virtual "buttons" associated with any of numerous possible actions, such as rotating or otherwise manipulating a displayed product, may be displayed on display surface 110. Alternatively, the user may interact with projected images of items. User movement sensor 118 detects when user 130 has moved her hand over a virtual button (indicating that user 130 has "activated" the virtual button) and, in response, product display system 100 may invoke images, sounds, and/or scents to virtually animate the action corresponding with the selected virtual button, thereby providing an experience akin to interacting with the actual physical product.

In some embodiments, projector 120 may project oblique anamorphic images onto display surface 110 to provide virtual 3-dimensional (3D) visualizations of products to user 130. As is known, oblique anamorphic images are drawn in a particular distortion in order to create an impression of 3 dimensions when seen from specific viewpoints. Anamorphic images (or anamorphosis) are more particularly described in the text "Hidden Images: Games of Perception, Anamorphic Art, Illusion: From the Renaissance to the Present" by Fred Leeman, Joost Elffers, Michael Schuyt, published by Harry N. Abrahams, Inc., 1976, ISBN-13: 9780810990197, ISBN: 0810990199, the contents of which are hereby incorporated by reference. As will be appreciated, realistic high-resolution oblique anamorphic images may be generated using a conventional rendering software application such as, for example, Autodesk's 3ds Max, Autodesk's 3D Studio Max, and/or Autodesk's MAYA. Constructing an oblique anamorphic image is a geometrical exercise known to those ordinarily skilled in the art, and is more particularly described for example in J. L Hunt, B. G. Nickel, and Christian Gigault's paper "Anamorphic images" published in the American Journal of Physics, March 2000, Volume 68, Issue 3, at pp. 232-237, the contents of which are hereby incorporated by reference.

In some embodiments, multiple sets of oblique anamorphic images may be pre-generated and stored at display system 100 for later presentation on surface 110, where each set corresponds to a different viewing angle. Each image may be a frame, and a set of images may be associated to provide full motion video at a suitable frame rate, such as 24 or 30 fps. Each set of oblique anamorphic images may display one or more items to be viewed by user, in motion. The items may for example move along a defined trajectory on surface 110. As described in more detail below, the viewing angle of user 130 may be determined by product display system 100, and a set of oblique anamorphic images optimal for user's 130 viewing angle may then be retrieved for presentation on surface 110.

Because such images are best viewed from specific viewpoints, marker 115 may be used to indicate to user 130 where user 130 may stand in order to enjoy an optimal viewing angle. Marker 115 may be projected onto the floor, or it may be an actual physical marker, for example painted on the floor. User height sensor 119 may also be used to more accurately determine the viewing angle of user 130, enabling product display system 100 to adjust the displayed images accordingly. For example, based on height information received from user height sensor 119 and the position of user 130 as determined by marker 115, product display system 100 may cause images optimized for user's 130 viewing angle to be displayed on display surface 110.

Figure 2:
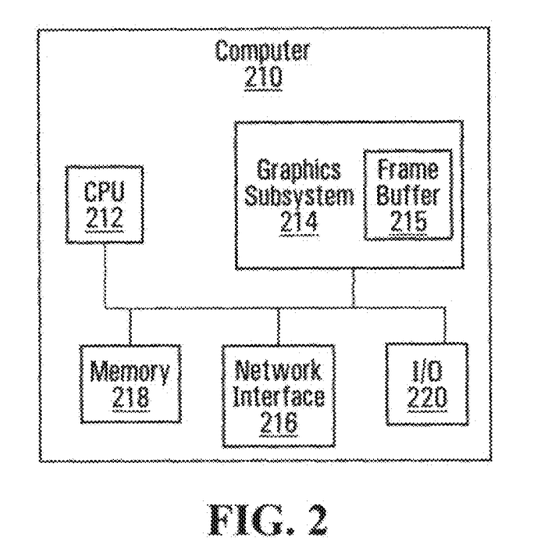
FIG. 2 is a simplified block diagram of the product display system of FIG. 1.

FIG. 2 illustrates a simplified block diagram of a computing device 210 forming part of product display system 100. In particular, as illustrated computing device 210 includes central processing unit (CPU) 212, graphics subsystem 214 having a frame buffer 215, network interface 216, and a suitable combination of persistent storage memory 218, random access memory and read only memory. Network interface 216 interconnects computing device 210 to a network such as a LAN or the Internet.

Projector 120 is coupled to computing device 210 by graphics subsystem 214. Subsystem 214 may include a graphics processor, display interface, and frame buffer 215. As is known in the art, images written to frame buffer 215 are provided to projector 120 for projection onto display surface 110, using a conventional display interface, such as a VGA, DVI, HDMI, DisplayPort or similar interface. It will be appreciated that in embodiments where display surface 110 forms part of a digital display, the digital display (rather than projector 120) is coupled to computing device 210 via graphics subsystem 214.

Kiosk 112, user movement sensor 118, user height sensor 119, speakers 116, and scent dispensers 117 are coupled to computing device 210 via one or more input/output (I/O) peripheral interfaces 220. Additional input/output peripherals such as keyboard, monitor, mouse, and the like of computing device 210 are not specifically detailed herein. These may also interconnect to device 210 via I/O peripheral interfaces 220.

Computing device 210 may for example be a conventional x86 based, Windows NT, Windows Vista, Windows XP, Apple, Macintosh, Linux, Solaris or similar based computer, known to those of ordinary skill. As will become apparent, computing device 210 may further host software allowing it to function in manners exemplary of embodiments of the present invention.

Figure 3:
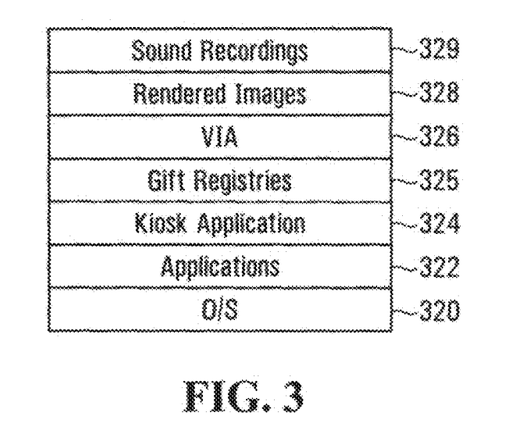
FIG. 3 is a schematic diagram of the product display system of FIG. 1.

A simplified organization of software components stored within persistent storage (i.e. memory 218) of computing device 210 is depicted in FIG. 3. As will be appreciated software components embodying depicted functional blocks may be loaded from a computer readable medium and stored within persistent storage memory 218 at computing device 210. As illustrated, software components may include operating system (0/S) software 320, applications 322, kiosk application 324, gift registries 325, virtual interaction application (VIA) 326, rendered images 328, and sound recordings 329, exemplary of embodiments of the present invention.

O/S software 320 may, for example be a Unix based operating system (e.g. Linux, FreeBSD, Solaris), a Microsoft Windows operating system, or the like. O/S software 320 may also include a TCTP/ICP stack allowing communication of computing device 210 with a network such as a LAN or the Internet via network interface 216.

Applications 322 may include a number of conventional retail applications, such as a point-of-sale application enabling user 130 to purchase products displayed through product display system 100. In an embodiment, application 332 may include or be in communication with a gift registry application, suitable for the order and sale of items chosen by or on behalf of a gift recipient. To that end, applications 332 may be in communication with a database storing items forming part of a gift list for the recipient. This database may similarly store lists of items chosen by or on behalf of various gift recipients serviced by the retail establishment operating system 100.

Kiosk application 324 provides a graphical user interface (GUI) via user interface 113 enabling user 130 to select from a number of functions including (1) browsing a products catalogue; (2) creating a gift registry; and (3) viewing an existing gift registry. The GUI may also enable user 130 to initiate a virtual product interaction session, as described below.

VIA 326 serves to control the virtual product interaction sessions described above. Specifically, in response to inputs from kiosk 112, user movement sensor 118 and/or user height sensor 119, VIA 326 may send one or more rendered images 328 to projector 120 for projection onto display surface 110. VIA 326 may also at appropriate times provide sound outputs 329, in the form of synthesized or recorded sounds, to speakers 116, and cause scent dispensers 117 to dispense certain scents.

A scenario exemplary of a user interaction with product display system 100 will now be described with reference to FIG. 1 and the flow charts of FIGS. 4 and 5.

Figure 4:
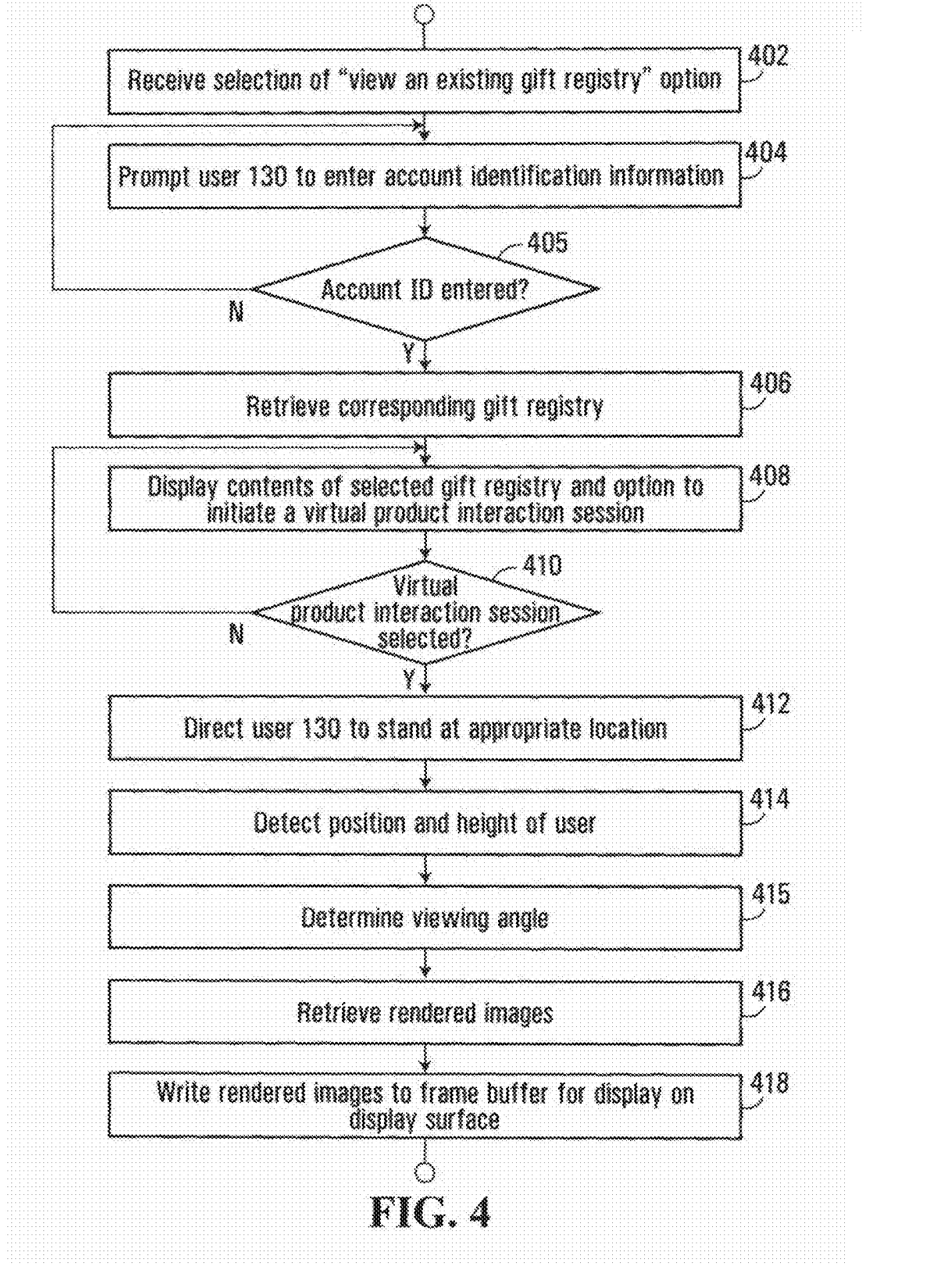
FIG. 4 is a simplified block diagram of the contents of the memory of FIG. 2.

The flow chart of FIG. 4 illustrates a process by which product display system 100 may initiate a virtual product interaction session. At the start, kiosk application 324 may receive an indication from user interface 113 that user 130 has selected the option to "view an existing gift registry" (step 402). In response, kiosk application 324 prompts user 130 via user interface 113 to enter account identification information (step 404). After account identification information is obtained (step 405), kiosk application 324 retrieves the corresponding gift registry from gift registries 325, which may include for example a list of selected products (step 406). Kiosk application 324 then causes the contents of the gift registry and related information (e.g. the list of selected products together with associated images and product information) to be displayed via user interface 113 (step 408). Additionally, user 130 is presented with an option to initiate a virtual product interaction session in association with the products listed in the selected gift registry. When the virtual product interaction session option is selected (step 410), VIA 326 may play a sound recording directing user 130 to stand at the location indicated by marker 115 (step 412). VIA 326 may also use height sensor 119 to detect the height of user 130 (step 414). Based on the height reading and on the position of user 130 as specified by marker 115, VIA 326 determines the viewing angle of user 130 (step 415) and retrieves a set of rendered images from rendered images 328 that correspond to the viewing angle of user 130 (step 416). VIA 326 then writes the selected rendered images to frame buffer 215, and the images are then projected by projector 120 onto display surface 110 (step 418). When displayed on display surface 110, the rendered images appear to user 130 as virtual versions of the products listed in the selected gift registry.

As will be appreciated, a series of rendered images may be used to depict the virtual products in animation—for example, the displayed products may appear to be rotating about the central axis of display surface 110. At the same time, VIA 326 may also retrieve a sound recording from sound recordings 329 that corresponds to the images displayed on display surface 110, and send it to speakers 116.

Similarly, VIA 326 may cause scent dispensers 117 to dispense certain scents corresponding to the images and/or sounds.

Conveniently, the series of images may depict items in the gift registry chosen by the user. All items, or the remaining items not yet purchased by users of the registry may be presented in the series of anamorphic images. A user is thus given a 3D presentations of items in the registry. Conveniently, the items may be animated, moving along a defined trajectory. For example, the items may be moved in a generally circular path on display surface 110. Possibly, a combination of all items in a gift list may be co-rendered, and images corresponding to different viewing positions for all the items in the list may be stored in images 328. For each gift list (i.e. for each gift registrant) a different collection of sets of images may be stored.

Figure 6A:
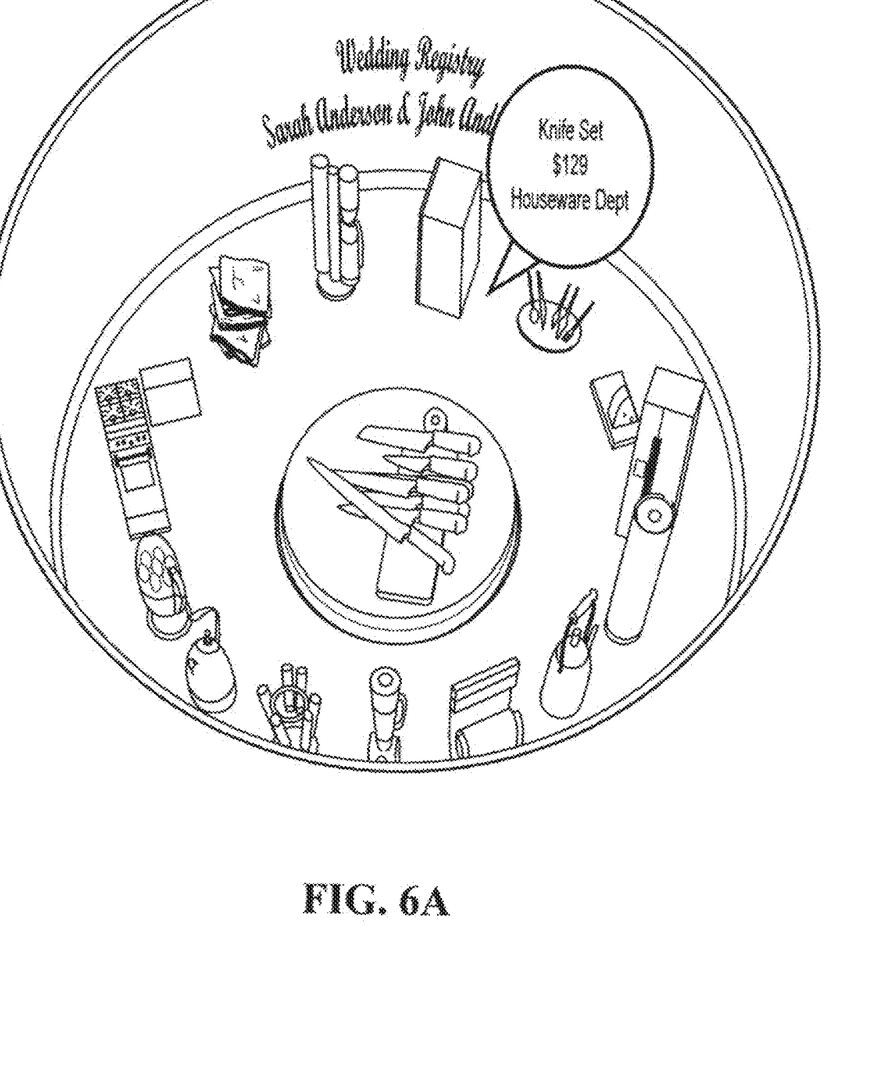
FIGS. 6A and 6B are images of projections of products of interest, formed by the product display system of FIG. 1.
Figure 6B:
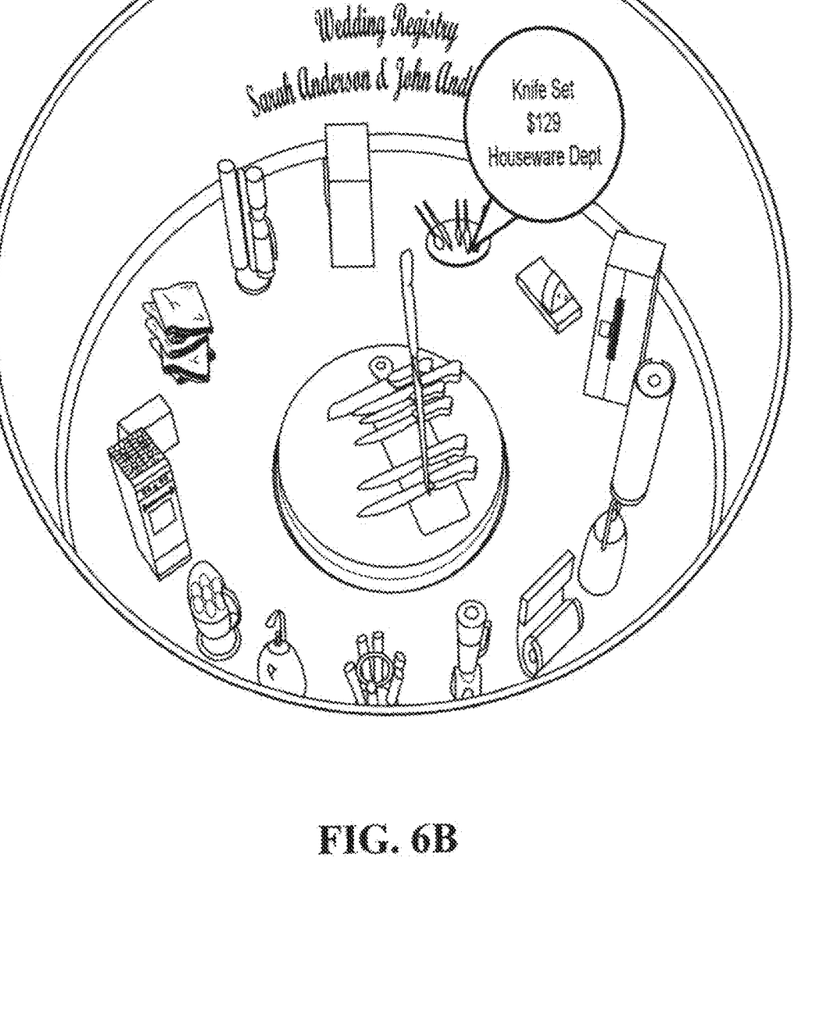

FIGS. 6A and 6B provide example anamorphic images of various items in a gift list that may be stored at device 210 for display on surface 110. These images are of course only exemplary. Many more images corresponding to different items (or sets of items) and viewing angles may be stored at device 210. In the particular examples, the knife set in the center of the images is being highlighted. This may be done as a result of user interaction, or otherwise.

Figure 5:
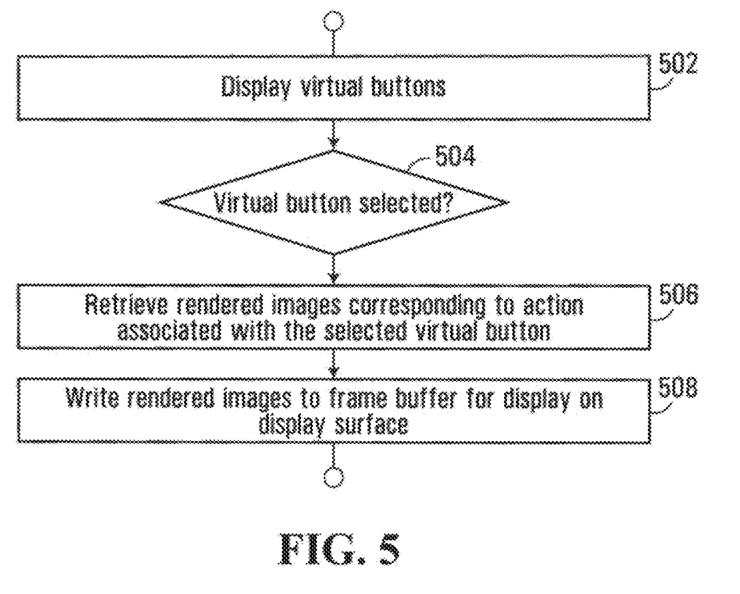
FIG. 5 is a flow chart of steps performed during a user interaction with a product display system that provides virtual product interaction.

The flow chart of FIG. 5 illustrates a process by which product display system 100 may enable user 130 to interact with the system during a virtual product interaction session. As noted, images displayed on display surface 110 appear to user 130 as virtual versions of the products listed in the selected gift registry. Additionally, the images may also depict virtual buttons associated with any of numerous possible actions, such as rotating or otherwise manipulating the displayed products (step 502). VIA 326 may receive an indication from user movement sensor 118 that user 130 has moved her hand over a virtual button (step 504) or a depicted object. In response, VIA 326 retrieves a set of rendered images from rendered images 328 that correspond to the action associated with the selected virtual button (step 506). The selected rendered images are also selected based on the viewing angle of user 130. VIA 326 then writes the selected rendered images to frame buffer 215 (step 508), and the images are then projected by projector 120 onto display surface 110. When displayed on display surface 110, the rendered images appear to user 130 as an animation corresponding to the action selected by user 130. As before, VIA 326 may also retrieve a sound recording from sound recordings 329 that corresponds to the images displayed on display surface 110, and send it to speakers 116. Similarly, VIA 326 may cause scent dispensers 117 to dispense certain scents corresponding to the images and/or sounds.

Optionally, the user may interact with virtual objects presented in the images. That is, movement of a user 130 contacting an item in an image may be sensed, and a new series of images may be presented on display surface 110. For example, by using two projectors, touching an image of an item presented by one projector may cause VIA 326 to cause a second projector to present a series of anamorphic images corresponding to the touched item. Similarly, the more information about the desired object may be provided—including for example its price; location or the like.

Also, in the event the items form part of a gift registry, items may be purchased by the interacting user. Identification (including purchase identification) may be provided at kiosk 112, or otherwise.

Though the images displayed on display surface 110 have been described as being pre-rendered and stored in persistent storage memory 218, it will be appreciated that in some embodiments the images may be rendered in real-time as required using conventional graphics processing technology such as a conventional graphics processing unit (GPU) and suitable graphics processing software such as a conventional gaming engine or the like.

It will also be appreciated that in some embodiments, display surface 110 may be a touch-screen digital display. In such embodiments, projector 120 and user movement sensor 118 may not be required, as images can be sent by VIA 326 directly to display surface 110 to be displayed by display surface 110, and inputs from user 130, such as touching a displayed virtual button, may be sensed by display surface 10 and indicated to VIA 326.

It will further be appreciated that rather than use marker 115 to direct user 130 to a particular optimal viewing location, product display system 100 may include a user position sensor, such as a camera and video processing software, to dynamically detect the position of user 130 and thus enable VIA 326 to dynamically determine the viewing angle of user 130 and to display images optimized for that viewing angle.

Also disclosed is a next generation retail technology through a revolutionary new Touch'nC™ technology. This customer-oriented experience is found, for example, in La Boutique, exclusive to The Hudson's Bay Queen Street Store in Canada. This dynamic new concept combines several new innovative technologies, including linking the simplicity of ordering items on the web with a theatrical in store experience whereby the customer can see all of the products that they pick up from a series of 30, 8 foot glass towers in a 3D photo realistic setting.

The technology in accordance with the present application allows customers to be detected on a perimeter of the boutique as they walk down varies isles surrounding the boutique. Our new motion detection component of the boutique allows ™Anna Maria, our virtual "Video-Wall" & La Boutique Ambassador, to greet and welcome every customer and describe featured items carried within La Boutique Anna Maria is activated when a passerby or potential customer is detected in near vicinity.

Start to Finish Customer Experience Around La Boutique

La Boutique serves as a platform highlighting the World's most unique gift ideas and is based on the same premises as Collate in Paris, on Rue Saint-Honore. The products carried in La Boutique are exclusive & one of a kind unique gift items.

Anna Maria's appearance in the boutique causes people to stop, stand and stare, as one cannot easily determine that she is less than human. Anna Maria will invite you in to the Boutique to use the touch n see fixtures and begin your revolutionary shopping experience. This interactive video wall is able to detect an approaching customer or a customer that has stopped in front of her; which then prompts Anna to inform and entertain the interested customer with exciting and informative Boutique information.

All products are placed out and in an unconfined way on the shelves for the customer to feel, test & try on. By touching any product, you will then trigger the 3D rendered branding video showing that item being used in context while displaying price information allowing you to experience this product with little assistance needed from a sales associate.

With the assistance of a Boutique sales associate or on your own, simply use the provided "consideration card" as your shopping cart and place the card upon the shelf that you wish to purchase the item and begin building your shopping cart. Similar to shopping online but with the luxury of bringing those special items gift wrapped and home with you today.

Other modifications will be apparent to those skilled in the art and, therefore, the invention is defined in the claims.

What is claimed is:

1. A product display system comprising:
   a height sensor for determining a height of a user;
   an input device for receiving a product selection from said user, said product selection corresponding to one or more physical products;
   a display unit having a generally horizontal stationary surface capable of supporting said one or more physical products;
   a computing device coupled to said height sensor and to said input device, said computing device comprising a frame buffer for outputting images to be displayed at said display unit, said computing device configured to:
   receive said product selection from said input device;
   receive said height from said height sensor and, based on said height, determine a viewing angle of said user in relation to said generally horizontal stationary surface; and
   write to said frame buffer one or more oblique anamorphic images computed in dependence on said viewing angle, said one or more oblique anamorphic images comprising distorted two dimensional images of said one or more physical products, distorted in order to create an impression of three dimensional images of said one or more physical products supported by and extending upwardly from said generally horizontal stationary surface and having same dimensions as a specimen of the one or more physical products when viewed from a viewpoint of the user, causing said one or more oblique anamorphic images to be displayed on said display unit, thereby creating an illusion of the one or more physical products supported on the generally horizontal stationary surface.

2. The product display system of claim 1, wherein said generally horizontal stationary surface comprises a table surface.

3. The system of claim 1, wherein said product display system further comprises a projector coupled to said frame buffer; said display unit comprises a projection screen; and said causing said one or more oblique anamorphic images to be displayed comprises causing said one or more images to be sent to said projector for projection onto said projection screen.

4. The system of claim 1, wherein said one or more oblique anamorphic images are pre-rendered using a rendering software application and stored in a memory, and wherein said computing device is further configured to retrieve said one or more oblique anamorphic images from said memory prior to said writing said one or more images to said frame buffer.

5. The system of claim 1, wherein said product display system further comprises one or more speakers, and said computing device is further configured to send a sound recording corresponding to said one or more images to said one or more speakers.

6. The system of claim 1, wherein said product display system further comprises one or more scent dispensers, and said computing device is further configured to cause a scent corresponding to said one or more images to be dispensed by said one or more scent dispensers.

7. The system of claim 1, wherein said one or more oblique anamorphic images further comprise one or more virtual buttons, each of said virtual buttons being associated with an action; said product display system further comprises a user movement sensor for detecting hand gestures of said user that correspond to activating said virtual buttons; and said computing device is further configured to:
   receive an indication from said user movement sensor that said user has activated a particular one of said virtual buttons; and
   responsive to said indication from said user movement sensor, write to said frame buffer a plurality of oblique anamorphic action images comprising animations corresponding to said action associated with said particular one of said virtual buttons, thereby causing said plurality of oblique anamorphic action images to be displayed on said generally horizontal stationary surface, said plurality of oblique anamorphic action images distorted in order to create an impression of three dimensional images of said one or more physical products supported by said generally horizontal stationary surface when viewed from the viewpoint of the user, and selected based on said viewing angle.

8. A method of providing virtual product interaction to a user, said method comprising:
   receiving a product selection from said user, said product selection corresponding to one or more physical products;
   determining a height of said user;
   based on said height, determining a viewing angle of said user in relation to a generally horizontal display surface, said generally horizontal display surface capable of supporting said one or more physical products;
   writing one or more oblique anamorphic images selected based on said viewing angle, said one or more oblique anamorphic images comprising two dimensional images distorted in order to create an impression of three dimensional images of said one or more physical products supported by and upstanding on said generally horizontal display surface and having the same dimensions as a specimen of the one or more physical products when viewed from said viewing angle, thereby creating an illusion of the one or more physical products supported on the generally horizontal display surface;
   causing said one or more oblique anamorphic images to be displayed on said generally horizontal display surface.

9. The method of claim 8, wherein said generally horizontal display surface comprises a projection screen; and said causing said one or more oblique anamorphic images to be displayed on said generally horizontal display surface comprises causing said one or more oblique anamorphic images to be sent to a projector for projection onto said generally horizontal display surface.

10. The method of claim 8, further comprising pre-rendering said one or more oblique anamorphic images using a rendering software application, storing said one or more oblique anamorphic images in a memory, and retrieving said one or more oblique anamorphic images from said memory prior to said writing said one or more oblique anamorphic images.

11. The method of claim 8, further comprising sending a sound recording corresponding to said one or more oblique anamorphic images to one or more speakers.

12. The method of claim 8, further comprising causing a scent corresponding to said one or more oblique anamorphic images to be dispensed by one or more scent dispensers.

13. The method of claim 8, wherein said one or more images further comprise one or more virtual buttons, each of said virtual buttons being associated with an action; said method further comprising:
- detecting a hand gesture of said user that corresponds to activating one of said virtual buttons;
- responsive to said detecting said hand gesture, writing a plurality of oblique anamorphic action images comprising animations corresponding to said action associated with said one of said virtual buttons, thereby causing said plurality of oblique anamorphic action images to be displayed on said generally horizontal display surface, said plurality of oblique anamorphic action images distorted in order to create an impression of three dimensions when viewed from a viewpoint of the user, and selected based on said viewing angle.

14. A product display system comprising:
- an input device for receiving information from a user indicative of at least a product of interest;
- a generally horizontal display surface capable of supporting said product of interest;
- a projector mounted above said generally horizontal display surface;
- a computing device coupled to said input device and said projector, said computing device comprising a frame buffer for outputting images to be displayed by said projector on said generally horizontal display surface, said computing device configured to:
  - write to said frame buffer one or more two dimensional images comprising anamorphic projections of said product of interest, that are distorted in two dimensions, yet are perceptible in three dimensions as said product of interest supported by and extending from said generally horizontal display surface and having the same dimensions as a specimen of said product of interest, when said one or more two dimensional images are displayed by said projector on said generally horizontal display surface and viewed by said user, thereby creating an illusion of said product of interest supported on the generally horizontal display surface.

15. The product display system of claim 14, comprising a second projector for presenting additional images comprising anamorphic projections on said generally horizontal display surface.

16. The product display system of claim 14, wherein said generally horizontal display surface comprises a table surface.

* * * * *